(12) United States Patent
Sharma et al.

(10) Patent No.: US 10,091,490 B2
(45) Date of Patent: *Oct. 2, 2018

(54) SCAN RECOMMENDATIONS

(71) Applicant: Hewlett-Packard Development Company, L.P., Houston, TX (US)

(72) Inventors: Divya Sharma, Palo Alto, CA (US); Daniel R. Tretter, Palo Alto, CA (US); Diogo Strube de Lima, Palo Alto, CA (US); Ilya Gerasimets, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/878,953

(22) Filed: Oct. 8, 2015

(65) Prior Publication Data
US 2017/0103511 A1    Apr. 13, 2017

(51) Int. Cl.
*G06K 9/00* (2006.01)
*G06K 9/46* (2006.01)
*G06T 15/00* (2011.01)
*H04N 13/25* (2018.01)
*H04N 13/02* (2006.01)
(Continued)

(52) U.S. Cl.
CPC ............... *H04N 13/25* (2018.05); *G06T 7/50* (2017.01); *G06T 17/00* (2013.01); *G06T 19/20* (2013.01); *H04N 13/025* (2013.01); *G06T 2200/24* (2013.01); *G06T 2207/10024* (2013.01); *G06T 2207/10028* (2013.01); *G06T 2219/2004* (2013.01); *H04N 13/0037* (2013.01);
(Continued)

(58) Field of Classification Search
CPC ......... G06T 7/0075; G06T 2207/10012; G06T 7/0002; G06T 7/0038; G06T 7/408; G06T 7/0081; G06T 7/602; G06T 2207/10028; G06T 2207/30168; G06T 2207/20144; G06T 2207/20021; H04N 13/0239; H04N 13/025; H04N 13/0246
USPC ....... 382/154, 162, 168, 166, 169, 173, 181, 382/190, 199, 203, 232, 237, 250, 254, 382/276; 345/419, 420–428, 589, 597
See application file for complete search history.

(56) References Cited

U.S. PATENT DOCUMENTS 7,835,568 B2 * 11/2010 Park ..................... G06T 17/10
                                                        382/154
8,050,491 B2 * 11/2011 Vaidyanathan ......... G06T 17/10
                                                        345/419
(Continued)

OTHER PUBLICATIONS

Oe, et al., "Scan Modeling: 3D Modeling Techniques using Cross Section of a Shape" University of Tsukuba, Tennoudai 1-1-1, Tsukuba, Ibaraki, Japan 305-8571 (8 pgs).

*Primary Examiner* — Sheela C Chawan

(57) ABSTRACT

In one implementation, a system for using a scan recommendation includes a receiver engine to receive a plurality of pictures of a three-dimensional (3D) object from a scanner, a model engine to generate a 3D model of the 3D object by aligning the plurality of pictures of the 3D object, an analysis engine to analyze the 3D model for a volume, a shape, and a color of the 3D object, wherein the volume, the shape, and the color analysis is used to generate scan recommendations, and a display engine to display information relating to the scan recommendations based on the volume, the shape, and the color analysis of the 3D model of the 3D object.

14 Claims, 2 Drawing Sheets

(51) Int. Cl.
- *G06T 17/00* (2006.01)
- *G06T 19/20* (2011.01)
- *G06T 7/50* (2017.01)
- *H04N 13/00* (2018.01)

(52) U.S. Cl.
CPC ..... *H04N 13/0253* (2013.01); *H04N 13/0271* (2013.01); *H04N 13/0275* (2013.01)

(56) References Cited

U.S. PATENT DOCUMENTS

| | | | |
|---|---|---|---|
| 8,452,081 B2 * | 5/2013 | Wang | G06T 15/205 |
| | | | 382/154 |
| 8,711,143 B2 | 4/2014 | Jin et al. | |
| 8,805,125 B1 | 8/2014 | Kumar et al. | |
| 8,848,201 B1 | 9/2014 | Bruce et al. | |
| 9,053,571 B2 * | 6/2015 | Shotton | G06T 17/10 |
| 9,208,607 B2 * | 12/2015 | Chu | G06T 17/00 |
| 9,361,553 B1 * | 6/2016 | Ito | G06T 19/20 |
| 2015/0009214 A1 | 1/2015 | Lee et al. | |
| 2015/0032242 A1 * | 1/2015 | Schouwenburg | B29C 67/0088 |
| | | | 700/98 |
| 2017/0103510 A1 * | 4/2017 | Wang | G06T 7/0002 |
| 2017/0103511 A1 * | 4/2017 | Sharma | G06T 7/0002 |

* cited by examiner

SCAN RECOMMENDATIONS

BACKGROUND

Three-dimensional (3D) scanning is useful for analyzing a real world object and constructing a digital model of that object. For example, 3D scanning may be used in the entertainment industry for digital productions such as movies and video games. Additional examples may include using 3D scanning in industrial design, prototyping, and quality control applications.

DETAILED DESCRIPTION

A number of methods, systems, and computer readable medium for scan recommendations are described herein. 3D scanning may be a time and resource consuming process. Further, scans that may not be acceptable may result depending on the 3D object to be scanned. For example, an unacceptable scan may occur depending on a 3D object's size, shape, and/or color. As a result, the scan may need to be re-performed, wasting valuable time and resources.

As used herein, a scan recommendation refers to using a plurality of pictures of a three-dimensional (3D) object received from a scanner to determine the 3D object's surface and material characteristics (e.g., volume, shape, color) in preparation for a full 3D scan of the 3D object. That is, a scan recommendation for the 3D object can be a recommendation about the 3D object's surface and material characteristics to configure and/or customize the full 3D scan of the 3D object. For example, generating a scan recommendation prior to a full 3D scan of the 3D object may help to program the full 3D scan. As another example, a scan recommendation may inform a user about potential problems with scanning the 3D object prior to performing a full 3D scan of the 3D object, allowing the user to reconfigure scan settings or abort a full scan of the 3D object.

As used herein, a 3D object may be any object about which scan recommendations may be generated. For example, a 3D object may be any object that may be scanned by a scanner. As a further example, a 3D object may be any object that has a height, width, and depth as a first, second, and third dimension. As used herein, a scanner may be any device that analyzes a real-world object (e.g., a 3D object) to collect data about its shape and/or appearance. The scanner may be a device with an attached camera, reader, projector, light source, and/or other suitable devices or combinations thereof. The scanner may be used to generate and transmit a plurality of pictures of the 3D object. The system can then analyze the pictures of the 3D object and generate a scan recommendation about the 3D object, as is further described herein. The system can then display information relating to the scan recommendation.

Figure 1:
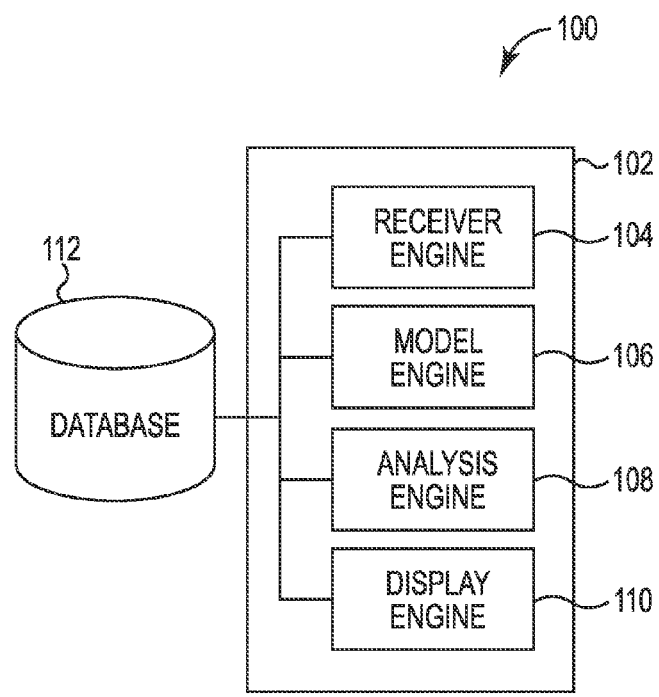
FIG. 1 illustrates a diagram of an example of a system for scan recommendations consistent with the present disclosure.
Figure 2:
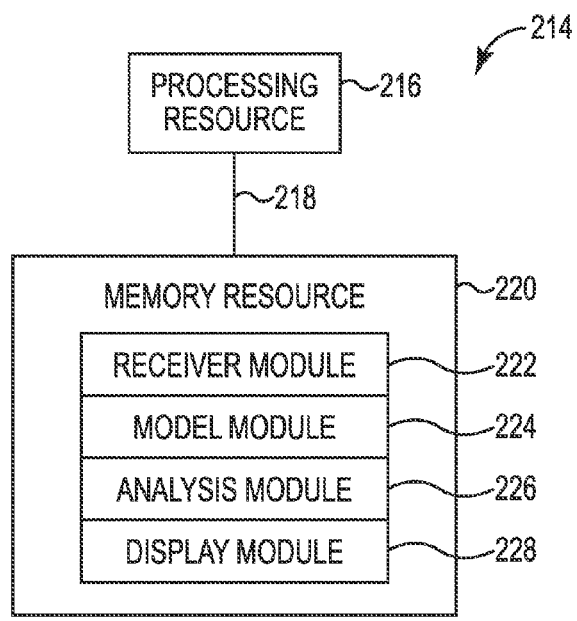
FIG. 2 illustrates a diagram of an example computing device consistent with the present disclosure.

FIGS. 1 and 2 illustrate examples of system 100 and computing device 214 consistent with the present disclosure. FIG. 1 illustrates a diagram of an example of a system 100 for scan recommendations consistent with the present disclosure. The system 100 can include a database 112, a scan recommendation system 102, and/or a plurality of engines (e.g., receiver engine 104, model engine 106, analysis engine 108, display engine 110). The scan recommendation system 102 can be in communication with the database 112 via a communication link, and can include the plurality of engines (e.g., receiver engine 104, model engine 106, analysis engine 108, display engine 110). The scan recommendation system 102 can include additional or fewer engines that are illustrated to perform the various elements as are described in further detail in connection with FIG. 3.

The plurality of engines (e.g., receiver engine 104, model engine 106, analysis engine 108, display engine 110) can include a combination of hardware and machine readable instructions (e.g., stored in a memory resource such as a non-transitory machine readable medium) that are executable using hardware components such as a processor, but at least hardware, to perform elements described herein (e.g., receive a plurality of pictures of a three-dimensional (3D) object from a scanner, generate a 3D model of the 3D object by aligning the plurality of pictures of the 3D object, analyze the 3D model for a volume, a shape, and a color of the 3D object, wherein the volume, the shape, and the color analysis is used to generate scan recommendations, display information relating to the scan recommendations based on the volume, the shape, and the color analysis of the 3D model of the 3D object, etc.).

The receiver engine 104 can include hardware and/or a combination of hardware and machine readable instructions, but at least hardware, to receive a plurality of pictures of a three-dimensional (3D) object from a scanner. As used herein, the plurality of pictures of the 3D object can include depth maps and color information. The depth maps can be utilized to generate point clouds, as is further described herein. The color information can be utilized to determine material characteristics of the 3D object, as is further described herein.

The model engine 106 can include hardware and/or a combination of hardware and machine readable instructions, but at least hardware, to generate a 3D model of the 3D object by aligning the plurality of pictures of the 3D object. For example, the model engine 106 can utilize the plurality of received pictures to generate a 3D model of the 3D object by aligning the plurality of pictures, as is further described herein.

The analysis engine 108 can include hardware and/or a combination of hardware and machine readable instructions, but at least hardware, to analyze the 3D model for a volume, a shape, and a color of the 3D object, wherein the volume, the shape, and the color analysis is used to generate scan recommendations. For example, the volume, the shape, and the color analysis of the 3D object may be utilized to generate recommendations about a size, contour, and material characteristics of the 3D object, as is further described herein.

The display engine 110 can include hardware and/or a combination of hardware and machine readable instructions, but at least hardware, to display information relating to the scan recommendations based on the volume, the shape, and the color analysis of the 3D model of the 3D object.

The database 112 can include digital information relating to the 3D object. That is, the database 110 can be utilized to store digital representations (e.g., a 3D model) of the 3D object. For example, the 3D model can include image data (e.g., point clouds, color information, or both). The database 112 can include the image data of the 3D model.

FIG. 2 illustrates a diagram of an example computing device 214 consistent with the present disclosure. The computing device 214 can include hardware, machine readable instructions on a non-transitory machine readable medium, or a combination thereof, to perform the elements described herein.

The computing device 214 can be any combination of hardware and machine readable instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The machine readable instructions (e.g., computer readable instructions (CRI)) can include instructions stored on the memory resource 220 and executable by the processing resource 216 to implement a desired element (e.g., receive a plurality of pictures of a three-dimensional (3D) object from a scanner, generate a 3D model of the 3D object by aligning the plurality of pictures of the 3D object, analyze the 3D model for a volume, a shape, and a color of the 3D object, wherein the volume, the shape, and the color analysis is used to generate scan recommendations, and display information relating to the scan recommendations based on the volume, the shape, and the color analysis of the 3D model of the 3D object, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A plurality of modules (e.g., receiver module 222, model module 224, analysis module 226, display module 228) can include CRI that when executed by the processing resource 216 can perform elements. The plurality of modules (e.g., receiver module 222, model module 224, analysis module 226, display module 228) can be sub-modules of other modules. For example, the model module 224 and the analysis module 226 can be sub-modules and/or contained within the same computing device. In another example, the plurality of modules (e.g., receiver module 222, model module 224, analysis module 226, display module 228) can comprise individual modules at separate and distinct locations (e.g., CRM, etc.).

Each of the plurality of modules (e.g., receiver module 222, model module 224, analysis module 226, display module 228) can include instructions that when executed by the processing resource 216 can function as a corresponding engine as described herein. For example, the receiver module 222 can include instructions that when executed by the processing resource 216 can function as the receiver engine 104. In another example, the model module 224 can include instructions that when executed by the processing resource 216 can function as the model engine 106. In another example, the analysis module 226 can include instructions that when executed by the processing resource 216 can function as the analysis engine 108. In another example, the display module 228 can include instructions that when executed by the processing resource 216 can function as the display engine 110.

Figure 3:
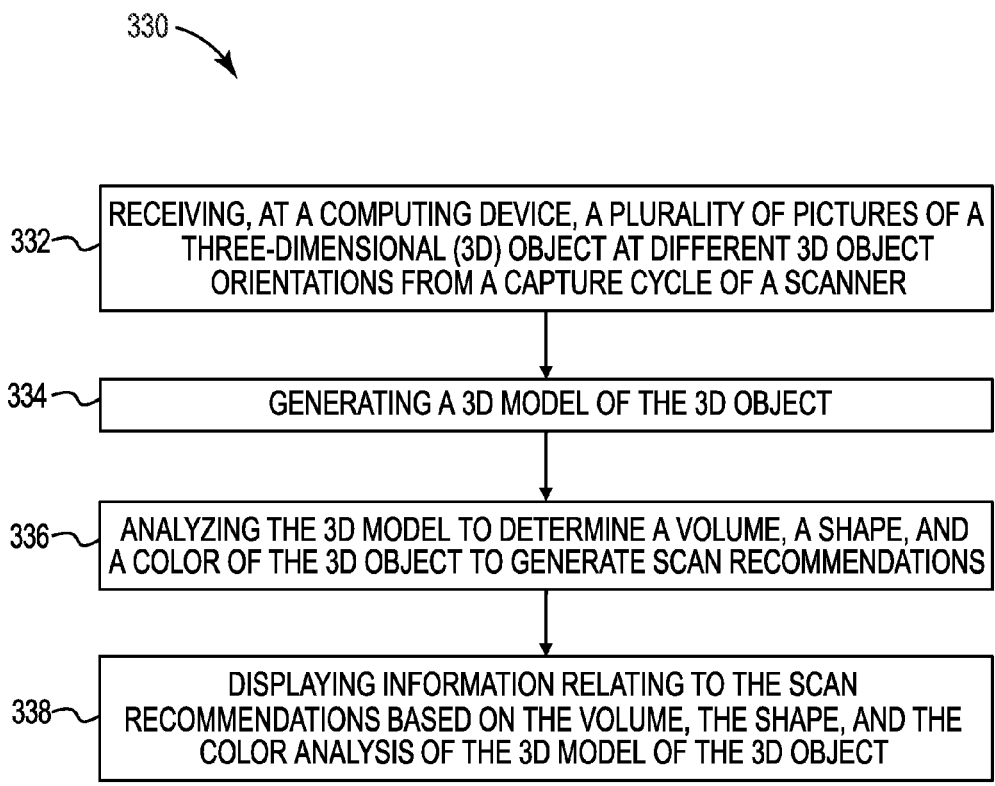
FIG. 3 illustrates a flow chart of an example method of scan recommendations consistent with the present disclosure.

FIG. 3 illustrates an example flow chart of an example method 330 of scan recommendations consistent with the present disclosure. For example, method 330 can be performed by a computing device (e.g., computing device 214 previously described in connection with FIG. 2) to generate scan recommendations.

As illustrated at 332, the method 330 can include receiving, at a computing device, a plurality of pictures of a three-dimensional (3D) object at different 3D object orientations from a capture cycle of a scanner. The plurality of pictures from the scanner can include image data of the 3D object and image data of a background, as is further described herein.

Although described as receiving a plurality of pictures of a 3D object from the scanner, embodiments of the disclosure are not so limited. For example, the computing device can receive one picture from the capture cycle of the scanner that includes image data of the 3D object and image data of a background.

As used herein, a capture cycle of a scanner can be a process of acquiring a plurality of pictures (e.g., one picture, or more than one picture) of an object (e.g., a 3D object) by the scanner, where the object is rotated within a single plane by a known angle (e.g., a rotation angle, as is further described herein). The rotated object may correspond to different 3D object orientations, as are further described herein.

A scanner can be a device that analyzes the 3D object to collect data about the shape and/or appearance of the 3D object. For example, the scanner can be a structured light scanner. As used herein, a structured light scanner can be a scanner which projects a pattern of light onto the 3D object to examine the deformation of the projected light pattern by the 3D object. For example, the scanner may project black and white patterns onto the 3D object to examine the deformation of the black and white patterns. A plurality of cameras included in the scanner can examine the shape of the patterns and calculate the distance of every point in the plurality of cameras' respective fields of view.

The scanner may include a depth-sensor camera and a red, green, and blue (RGB) camera. As used herein, a depth-sensor camera may be a camera that utilizes a pattern of light from a structured light to capture a depth map picture of a 3D object, as is further described herein. A depth-sensor camera may be used to determine a size and contour of the 3D object. For example, a depth-sensor camera may be used to determine a size of the 3D object and/or a contour of the 3D object, as is further described herein.

As used herein, an RGB camera may be a camera that utilizes a plurality of charge-coupled device (CCD) sensors to acquire color signals (e.g., red, green, and blue) of the 3D object. An RGB camera may be used to acquire material characteristics of the 3D object. For example, an RGB camera may be used to determine whether the 3D object, or parts of the 3D object, are a certain color, are too bright, and/or too dark, as are further described herein.

The scanner may utilize both the depth-sensor camera and the RGB camera together to determine other material characteristics. For example, depth and color may be measured by the depth-sensor camera and the RGB camera, respectively, to determine material characteristics such as whether the 3D object, or parts of the 3D object are too shiny or are transparent.

The plurality of pictures of the 3D object may include point clouds and color information. The plurality of pictures of the 3D object including color information may be received from the RGB camera of the scanner.

Color information can refer to a visual property of the 3D object. For example, color information can refer to a color of the 3D object (e.g., blue, red, yellow, etc.) As another example color information can refer to a color characteristic of the 3D object (e.g., bright, dark, etc.) Although color information is described as referring to a color and/or a color characteristic of the 3D object, examples of the disclosure are not so limited.

As used herein, a point cloud can be a set of data points in a coordinate system. For example, a point cloud can be a set of data points in a three-dimensional coordinate system (e.g., X, Y, and Z coordinates). A point cloud can represent the external surface of an object (e.g., the 3D object) that a device (e.g., a scanner) has measured. For example, the 3D object may be represented by a set of data points included in a point cloud or a plurality of point clouds, where the point clouds include coordinate information for the set of data points.

Point clouds may be extracted from depth maps of the plurality of pictures of the 3D object. The plurality of pictures of the 3D object including depth maps may be received from the depth-sensing camera of the scanner. As used herein, a depth map is an image that includes information relating to the distance of surfaces of an object (e.g., a 3D object) from a viewpoint of a device (e.g., a scanner).

The plurality of pictures of the 3D object may include image data of the 3D object and image data of a background. For example, the 3D object may be placed on a surface during the capture cycle of the scanner. The capture cycle of the scanner may capture image data of the 3D object, as well as image data of a background. That is, the capture cycle of the camera may capture point clouds and color information related to the 3D object, as well as point clouds and color information related to the background. The background image data can be separated from the 3D object image data, as is further described herein.

In some examples, the 3D object may be placed on a turn table having a background. As used herein, a turn table may be a mechanically operated device that rotates the 3D object by a specified angle. For example, the turn table may rotate the 3D object during the capture cycle of the scanner.

The plurality of pictures of the 3D object may be captured at a plurality of orientations of the 3D object. For example, the 3D object may be captured by a first plurality of pictures (e.g., three pictures) at a zero orientation. The 3D object may then be rotated (e.g., by a turn table) and captured by a second plurality of pictures (e.g., three additional pictures) at a first rotated orientation (e.g., 30 degrees) relative to the zero orientation. The 3D object may again be rotated and captured by a third plurality of pictures (e.g., three additional pictures) at a second rotated orientation (e.g., 60 degrees) relative to the zero orientation.

Although the plurality of pictures at each 3D object orientation is described as being three, examples of the disclosure are not so limited. For example, the plurality of pictures at each 3D object orientation may be less than three (e.g., two or less) or more than three (e.g., four or more).

In some examples, the plurality of orientations of the 3D object may be four. For example, the plurality of pictures of the 3D object may be captured at four different orientations of the 3D object. That is, the 3D object may be captured at a zero orientation, a first orientation, a second orientation, and a third orientation, although examples of the disclosure are not so limited.

The plurality of orientations of the 3D object may be based on unique rotation angles of the 3D object relative to the scanner. That is, the different 3D object orientations of the plurality of pictures of the 3D object may correspond to a different rotation angle of the 3D object relative to the scanner. For example, a zero orientation of the 3D object may be associated with a rotation angle of 0 degrees relative to the scanner. Additionally, a first orientation of the 3D object may be associated with a rotation angle of 30 degrees relative to the scanner, a second orientation of the 3D object may be associated with a rotation angle of 60 degrees relative to the scanner, and a third orientation of the 3D object may be associated with a rotation angle of 90 degrees relative to the scanner. A turn table may rotate the 3D object to each rotation angle during the capture cycle of the scanner.

Although described as having rotation angles of 0 degrees, 30 degrees, 60 degrees, and 90 degrees relative to the camera, respectively, examples of the disclosure are not so limited. For example, rotation angles may be any other set of angles (e.g., 0 degrees, 45 degrees, 90 degrees).

As illustrated at 334, the method 330 can include generating a 3D model of the 3D object. For example, a 3D model of the 3D object may be generated using the plurality of pictures of the 3D object from the capture cycle of the scanner.

Generating the 3D model of the 3D object may include removing the background image data from the plurality of pictures. For example, the background image data (e.g., image data corresponding to a surface on which the 3D object was placed during the capture cycle) may be removed such that only the 3D object image data remains.

Generating the 3D model of the 3D object can include extracting point clouds from the image data of the 3D object of the plurality of pictures corresponding to each different 3D object orientation. Point clouds corresponding to each different 3D object orientation may be extracted from the plurality of pictures. That is, a point cloud may be extracted from each picture of the 3D object at each 3D object orientation (e.g., zero orientation, first orientation, second orientation, etc.) For example, if three pictures are taken at a zero orientation, three point clouds may be extracted from the pictures corresponding to the zero orientation. If three pictures are taken at each of four 3D object orientations (e.g., zero orientation, first orientation, second orientation, third orientation), a total of twelve point clouds may be extracted from twelve pictures (e.g., three pictures at each 3D object orientation).

Generating the 3D model of the 3D object can include aligning the point clouds from the plurality of pictures using a unique rotation angle corresponding to the different 3D object orientations. For example, the three pictures taken at each of four 3D object orientations may be aligned using the unique rotation angle corresponding to each different 3D object orientation. As another example, a plurality of pictures at only one 3D object orientation may not need to be aligned, as they are received from the capture cycle of the scanner at the same orientation.

Aligning the point clouds from the plurality of pictures corresponding to each different 3D object orientation can include rotating the point clouds corresponding to each of the plurality of pictures by a unique rotation angle. That is, three pictures taken at a zero orientation (e.g., three point clouds at a rotation angle of 0 degrees), three pictures taken at a first orientation (e.g., three point clouds at a rotation angle of 30 degrees), three pictures taken at a second orientation (e.g., three point clouds at a rotation angle of 60 degrees), and three pictures taken at a third orientation (e.g., three point clouds at a rotation angle of 90 degrees) may be aligned using the respective rotation angle of the pictures at each 3D object orientation. For example, the three point clouds at the first orientation can be at a rotation angle of 0 degrees. The three point clouds at the second orientation can be at a rotation angle of 30 degrees so that the three point clouds at the second orientation may be rotated 30 degrees to align with the three point clouds at the first orientation. Additionally, the three point clouds at the third orientation can be at a rotation angle of 60 degrees so that the three point clouds at the third orientation may be rotated 60 degrees to align with the three point clouds at the first orientation.

In some examples, the point clouds corresponding to the plurality of pictures may be rotated using a Point Cloud Library (PCL). As used herein, a PCL can be a library of algorithms for point cloud processing tasks. A PCL may be used to align the point clouds corresponding to each of the plurality of pictures at each 3D object orientation. PCL may be used to coarsely align the point clouds by a larger rotation range (e.g., 10-90 degrees).

Although PCL is described as rotating point clouds by a range of 10-90 degrees, examples of the present disclosure are not so limited. For example, PCL may be used to align the point clouds by a smaller rotation (e.g., less than 10 degrees) or by a larger rotation (e.g., more than 90 degrees).

Aligning the point clouds from the plurality of pictures corresponding to each different 3D object orientation can include revising the rotation of the point clouds of each of the plurality of pictures to minimize a distance between the point clouds. For example, an iterative closest point (ICP) algorithm may be used to refine the alignment of the point clouds. For example, ICP may be used to finely align the point clouds by a smaller rotation range relative to PCL (e.g., 1-3 degrees).

Although ICP described as rotating point clouds by a range of 1-3 degrees, examples of the present disclosure are not so limited. For example, ICP may be used to align the point clouds by a smaller rotation (e.g., less than 1 degree) or by a larger rotation (e.g., more than 3 degrees).

In some examples, the point clouds may not need to be aligned. For example, a point cloud or point clouds received from a plurality of pictures at only one 3D object orientation may not need to be rotated, as they are received from the capture cycle of the scanner at the same orientation.

The method 330 may also include removing outlier point clouds from the 3D model. For example, a point cloud and/or a given data point within a point cloud that does not satisfy a plurality of given conditions may be removed from the 3D model. As another example, a point cloud and/or a given data point that is not within a range of other point clouds or given data points, respectively, may be removed from the 3D model.

As illustrated at 336, the method 330 may include analyzing the 3D model to determine a volume, a shape, and a color of the 3D object to generate scan recommendations. For example, the volume, the shape, and the color of the 3D object may be utilized to determine information about the size, contour, and material characteristics of the 3D object.

Analyzing the 3D model for a volume, a shape, and a color may include dividing the 3D model into a first plurality of quadrants and analyzing each quadrant of the first plurality of quadrants for symmetry with other quadrants of the first plurality of quadrants. For example, the 3D model may be divided into a first plurality of quadrants. Each quadrant may be analyzed for symmetry with other quadrants of the first plurality of quadrants. Symmetry may be achieved when each quadrant of the first plurality of quadrants includes point cloud data overlapping with the point cloud data in quadrants located on either side of the first plurality of quadrants.

If symmetry is not achieved with the first plurality of quadrants, the 3D model may be divided into a second plurality of quadrants, where the second plurality of quadrants is greater than the first plurality of quadrants (e.g., each quadrant of the second plurality of quadrants is smaller in size than each quadrant of the first plurality of quadrants). Each quadrant of the second plurality of quadrants may again be analyzed for symmetry with other quadrants of the second plurality of quadrants.

Although described as dividing the 3D model into a first and then a second plurality of quadrants, examples of the disclosure are not so limited. For example, the 3D model may be divided into a further plurality of quadrants beyond a second plurality of quadrants, where each successive plurality of quadrants are smaller than the last, until symmetry is achieved in the 3D model.

Generating scan recommendations may include generating recommendations about a size of the 3D object based on the volume analysis of the 3D model of the 3D object. Dividing the 3D model into quadrants and analyzing the quadrants for symmetry may generate a volume of the 3D object. Using the volume of the 3D object, the recommendations about the size of a 3D object may be used to configure a plurality of settings of a full 3D scan process to enable faster and/or more efficient scanning of the 3D object.

In some examples, the size recommendation may include a recommendation that the 3D object is too big. For example, the 3D object may be too big to capture with the scanner. That is, portions of the 3D object may be outside the field of view of the scanner such that the scanner cannot capture the entire 3D object.

In some examples, the size recommendations may include a recommendation that the 3D object is too small. For example, the 3D object may be too small to capture with the scanner. That is, the scanner may not have a high enough resolution to capture the 3D object.

In some examples, the size recommendations may include a recommendation for a plurality of scans that may be required to capture the 3D object during a full 3D scan. For example, the 3D object may need to be captured at a specified plurality of object orientations during the full 3D scan. As another example, the 3D object may need to be captured by a certain plurality of pictures at each 3D object orientation during the full 3D scan.

Generating scan recommendations may include generating recommendations about a contour of the 3D object based on the shape analysis of the 3D model of the 3D object. Dividing the 3D model into quadrants and analyzing the quadrants for symmetry may generate a shape of the 3D object. Using the shape of the 3D object, the recommendation about the contour of a 3D object may be used to configure a plurality of settings of a full 3D scan process to enable faster and/or more efficient scanning of the 3D object. For example, the contour recommendations may include a recommendation that the contour of the 3D object is too complex. That is, the contour of the 3D object may be too jagged, which may lead to a failed scan and/or a recommendation to configure settings in response to the recommendation.

Generating scan recommendations may include generating recommendations about a material characteristic of the 3D object based on the color analysis of the 3D model of the 3D object. For example, color information from the plurality of pictures of the 3D object (e.g., from an RGB camera in the scanner) may be analyzed to generate a recommendation about a material characteristic of the 3D object. The recommendations about the material characteristic of a 3D object may be used to configure a plurality of settings of a full 3D scan process to enable faster and/or more efficient scanning of the 3D object.

In some examples, the material characteristic recommendations may include a recommendation that the material of the 3D object is too shiny. That is, the 3D object, or parts of the 3D object, may cause reflectivity and/or other issues with the scanner, which may lead to a failed scan and/or a recommendation to configure settings in response to the recommendation.

In some examples, the material characteristic recommendations may include a recommendation that the material of the 3D object is too dark. That is, the 3D object, or parts of the 3D object, may not be able to be scanned with the scanner, which may lead to a failed scan and/or a recommendation to configure settings in response to the recommendation.

In some examples, the material characteristic recommendations may include a recommendation that the material of the 3D object is transparent. That is, the 3D object, or parts of the 3D object, may not be able to be scanned with the scanner, which may lead to a failed scan and/or a recommendation to configure settings in response to the recommendation.

A scan recommendation can include a recommendation to set scan parameters. For example, the volume, the shape, and the color analysis of the 3D model of the 3D object may be used to generate a recommendation about scan parameters. Scan parameters may include an exposure time of the depth-sensor camera and/or the RGB camera. As another example, scan parameters may include a pattern density of the structured light of the depth-sensing camera. As a further example, scan parameters may include the number of scans per capture cycle of the scanner.

Although scan parameters are described as including an exposure time, pattern density, and the number of scans per cycle, embodiments of the disclosure are not so limited. For example, scan parameters can include any other adjustable parameters.

Although described as generating individual recommendations about the size, contour, and material characteristics of the 3D object using the volume, the shape, and the color analysis, embodiments of the disclosure are not so limited. For example, the volume, the shape, and the color analysis of the 3D object may all be used to indicate the 3D object is too flat, and that a different 3D object orientation may be needed to correctly scan the 3D object.

Generating scan recommendations may include generating an image of the 3D model. For example, point clouds (e.g., aligned point clouds) and color information from the plurality of pictures of the 3D object may be used to generate an image of the 3D model of the 3D object. The image of the 3D model of the 3D object may be used by a user to visually inspect the 3D model of the 3D object prior to a full scan of the 3D object.

As illustrated at 338, the method 330 can include displaying information relating to the scan recommendations based on the volume, the shape, and the color analysis of the 3D model of the 3D object. For example, information relating to the scan recommendations including a size of the 3D object, a contour of the 3D object, a material characteristic of the 3D object, and an image of the 3D model of the 3D object may be displayed.

Information relating to the scan recommendations may be displayed on a user interface. As used herein, a user interface may include a graphical user interface (GUI) that can include a display (e.g., a screen) that can provide and/or receive information (e.g., scan recommendations) to and/or from a user. The display can be, for instance, a touch-screen (e.g., the GUI can include touch-screen capabilities). Alternatively, a display can include a television, computer monitor, mobile device screen, or other type of display device. Examples of the disclosure, however, are not limited to a particular type(s) of user interface.

As described herein, a plurality of pictures of a 3D object may be received from a scanner and a 3D model of the 3D object may be generated. After analyzing the 3D model for a volume, a shape, and a color, scan recommendations may be generated. The scan recommendations may provide information about potential problems such as size, shape, and/or material characteristic issues in performing a full 3D scan of the 3D object. Providing the scan recommendations prior to performing the full 3D scan of the 3D object may allow for reconfiguration of scan settings, or allow for an abort of the full scan of the 3D object.

As used herein, "logic" is an alternative or additional processing resource to perform a particular action and/or element described herein. Logic can include hardware. The hardware can include processing resources such as circuitry, which are distinct from machine readable instructions on a machine readable media. Further, as used herein, "a" or "a plurality of" something can refer to one or more such things. For example, "a plurality of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system, comprising:
  a processing resource; and
  a memory resource storing machine readable instructions to cause the processing resource to:
    receive, via a receiver engine, a plurality of pictures of a three-dimensional (3D) object from a scanner;
    generate, via a model engine, a 3D model of the 3D object by aligning the plurality of pictures of the 3D object;
    analyze, via an analysis engine, the 3D model for a volume, a shape, and a color of the 3D object to generate a scan recommendation, wherein the scan recommendation includes a recommendation to set adjustable scan parameters in preparation for a full 3D scan of the 3D object; and display, via a display engine, information relating to the scan recommendation based on the volume, the shape, and the color analysis of the 3D model of the 3D object.

2. The system of claim 1, wherein the information relating to the scan recommendation includes a size of the 3D object, a contour of the 3D object, a material characteristic of the 3D object, and an image of the 3D model.

3. The system of claim 1, wherein the plurality of pictures of the 3D object are captured at a plurality of orientations of the 3D object.

4. The system of claim 3, wherein the plurality of orientations of the 3D object are based on unique rotation angles of the 3D object relative to the scanner.

5. The system of claim 1, wherein the plurality of pictures of the 3D object include point clouds and color information, wherein a point cloud is a set of data points in a 3D coordinate system.

6. The system of claim 1, wherein the scanner includes:
a depth-sensor camera; and
a red, green, and blue (RGB) camera.

7. A method, comprising:
receiving, at a computing device, a plurality of pictures of a three-dimensional (3D) object at different 3D object orientations from a capture cycle of a scanner, wherein the plurality of pictures include image data of the 3D object and image data of a background;
generating, at the computing device, a 3D model of the 3D object by:
removing the background image data from the plurality of pictures;
extracting point clouds from the image data of the 3D object of the plurality of pictures corresponding to each different 3D object orientation; and
aligning the point clouds from the plurality of pictures using a unique rotation angle corresponding to the different 3D object orientations;
analyzing the 3D model to determine a volume, a shape, and a color of the 3D object to generate scan recommendations, wherein the scan recommendation includes a recommendation to set adjustable scan parameters in preparation for a full 3D scan of the 3D object; and
displaying information relating to the scan recommendations based on the volume, the shape, and the color analysis of the 3D model of the 3D object.

8. The method of claim 7, wherein aligning the point clouds from the plurality of pictures corresponding to each different 3D object orientation includes:
rotating the point clouds corresponding to the plurality of pictures by a rotation angle; and
revising the rotation of the point clouds of the plurality of pictures to minimize a distance between the point clouds.

9. The method of claim 8, generating the scan recommendations includes:
generating a recommendation about a size of the 3D object based on the volume analysis of the 3D model of the 3D object;

generating a recommendation about a contour of the 3D object based on the shape analysis of the 3D model of the 3D object;
generating a recommendation about a material characteristic of the 3D object based on the color analysis of the 3D model of the 3D object; and
generating an image of the 3D model.

10. The method of claim 7, wherein analyzing the 3D model includes:
dividing the 3D model into a first plurality of quadrants; and
analyzing each quadrant of the first plurality of quadrants for symmetry with other quadrants of the first plurality of quadrants.

11. The method of claim 10, wherein analyzing the 3D model includes:
dividing the 3D model into a second plurality of quadrants; and
analyzing each quadrant of the second plurality of quadrants for symmetry with other quadrants of the second plurality of quadrants;
wherein the second plurality of quadrants is greater than the first plurality of quadrants.

12. A non-transitory computer readable medium storing instructions executable by a processing resource to cause a computing device to:
receive, from a scanner, a plurality of pictures of a three-dimensional (3D) object at different 3D object orientations, wherein the plurality of pictures include image data of the 3D object and image data of a background;
generate a 3D model of the 3D object by:
removing the image data relating to the background from the plurality of pictures;
extracting point clouds corresponding to each different 3D object orientation from the plurality of pictures; and
aligning the point clouds from the plurality of pictures;
analyze the 3D model to determine a volume, a shape, and a color of the 3D object to generate scan recommendations by:
dividing the 3D model into a first plurality of quadrants and a second plurality of quadrants; and
analyzing each quadrant of the first plurality of quadrants for symmetry with other quadrants of the first plurality of quadrants and each quadrant of the second plurality of quadrants for symmetry with other quadrants of the second plurality of quadrants;
wherein the second plurality of quadrants is greater than the first plurality of quadrants;
display, via a user interface, information relating to the recommendations based on the volume, the shape, and the color analysis of the 3D object.

13. The medium of claim 12, wherein the different 3D object orientations of the plurality of pictures of the 3D object corresponds to a unique rotation angle of the 3D object relative to the scanner.

14. The medium of claim 12, comprising instructions to remove outlier point clouds from the 3D model.

* * * * *